INVENTOR.
LUDGER E. LA BRIE
BY
ATTORNEY

May 25, 1937.  L. E. LA BRIE  2,081,589
BRAKE
Filed Oct. 29, 1934  5 Sheets-Sheet 2

INVENTOR.
LUDGER E. LA BRIE
BY
ATTORNEY

May 25, 1937.  L. E. LA BRIE  2,081,589
BRAKE
Filed Oct. 29, 1934 5 Sheets-Sheet 3
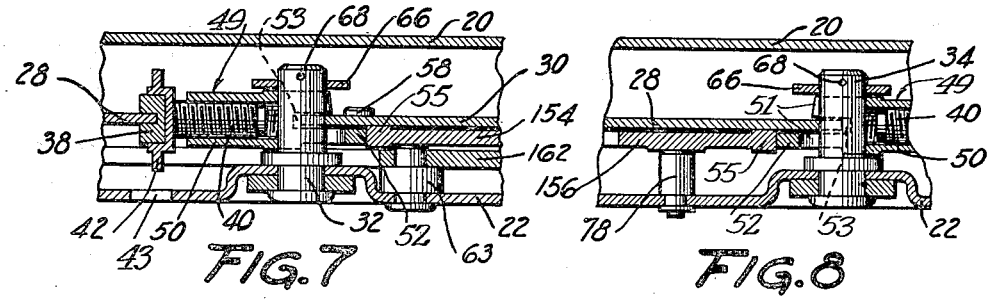
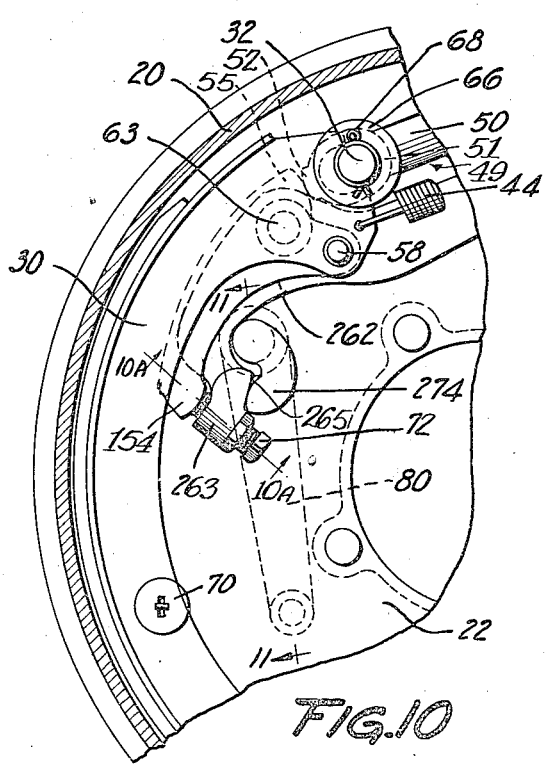
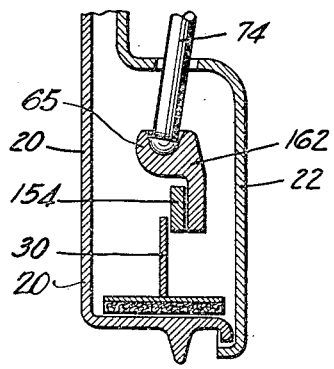
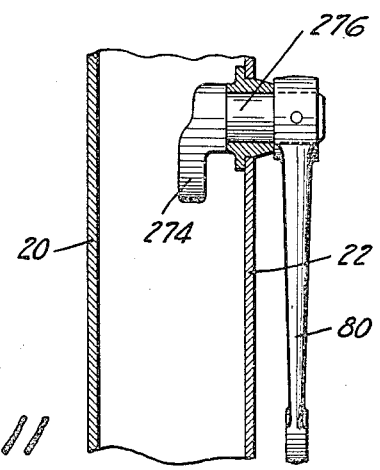
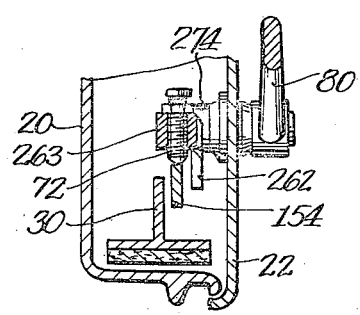
INVENTOR.
LUDGER E. LA BRIE
BY
ATTORNEY May 25, 1937.  L. E. LA BRIE  2,081,589
BRAKE
Filed Oct. 29, 1934   5 Sheets-Sheet 4

INVENTOR.
LUDGER E. LA BRIE
BY
*Jno. W. McConkey*
ATTORNEY

May 25, 1937.    L. E. LA BRIE    2,081,589
BRAKE
Filed Oct. 29, 1934    5 Sheets-Sheet 5
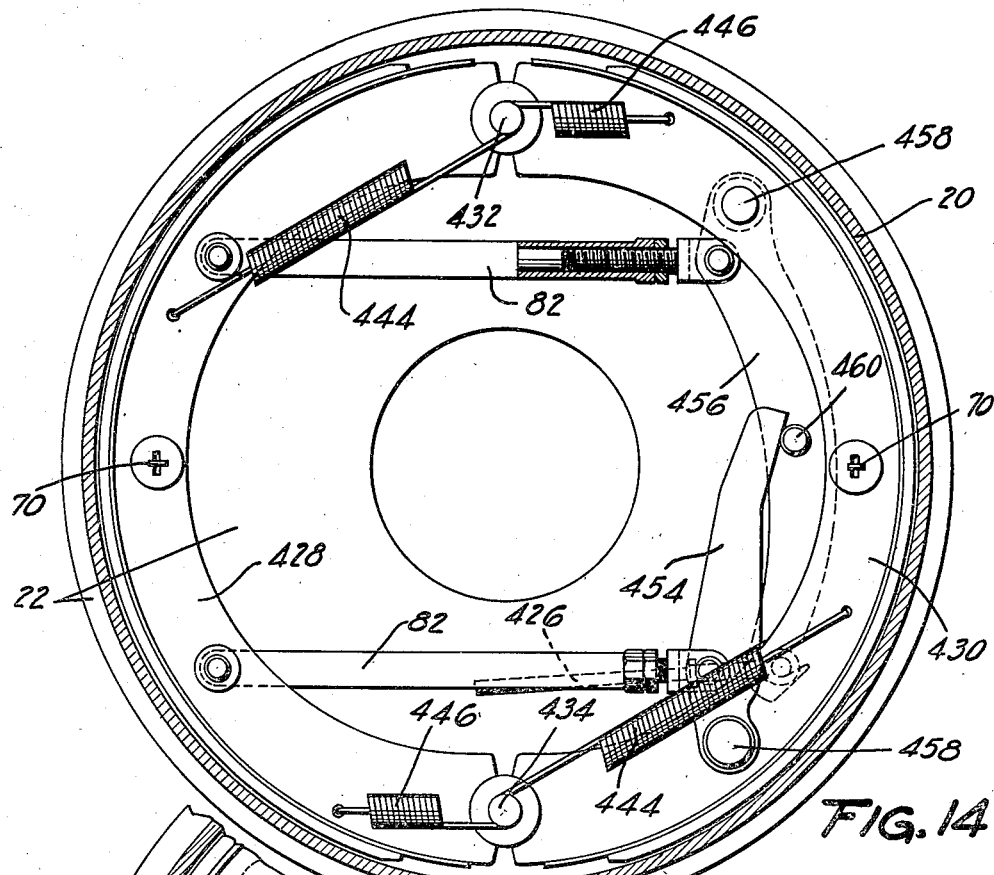
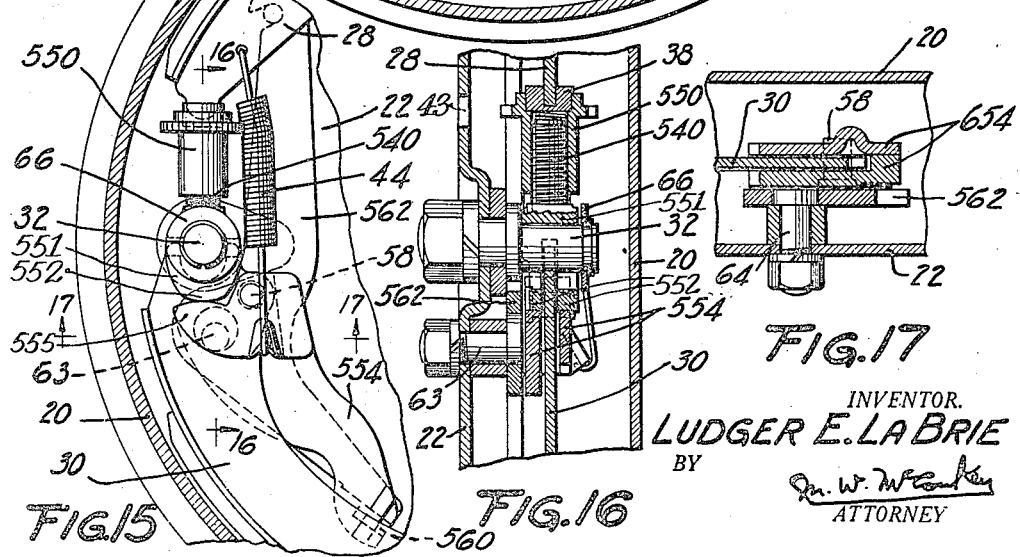
INVENTOR.
LUDGER E. LA BRIE
BY
ATTORNEY Patented May 25, 1937

2,081,589

UNITED STATES PATENT OFFICE 2,081,589

BRAKE

Ludger E. La Brie, South Bend, Ind., assignor to Bendix Products Corporation, South Bend, Ind., a corporation of Indiana Application October 29, 1934, Serial No. 750,434

21 Claims. (Cl. 188—78)

This invention relates to brakes, and is illustrated as embodied in internal expanding automobile brakes of the double-acting type in which each of a plurality of shoes shifts to anchor at one end or the other according to the direction of rotation of the brake drum, so that all of the shoes are fully effective although there is substantially no compounding of the action of one shoe on another.

An object of the invention is to lessen the cost of construction, and at the same time to make the brake anchorage very strong and rigid, by using solid anchors and arranging the other parts to clear them.

In the arrangements illustrated, the shoes each engage one anchor at one end, and at the other end each of them is provided with a novel adjusting device formed with a yoke or the like encircling and engaging the anchor and projecting beyond it. The applying means preferably includes a pair of levers, each pivoted on or otherwise engaging the anchor-engaging end of one shoe and arranged in thrust engagement with the yoke of the other shoe.

I prefer to arrange the levers in the space between the shoes and the backing plate, and some features of novelty relate to the arrangement and means of operation of these levers.

Another feature of the invention relates to the construction and arrangement of the adjusting device. Preferably this device includes two parts which are threaded together, one of which parts is formed with the above-described yoke and the other of which has its end formed with a circular socket rotatably receiving a circular thrust device formed in one face with a slot or other means receiving the end of the web of the brake shoe. The adjustment may conveniently be yieldingly locked by engagement with the brake return spring.

The above and other objects and features of the invention, including various novel combinations of parts and desirable particular constructions, will be apparent from the following description of the illustrative embodiments shown in the accompanying drawings, in which.

Figure 1:
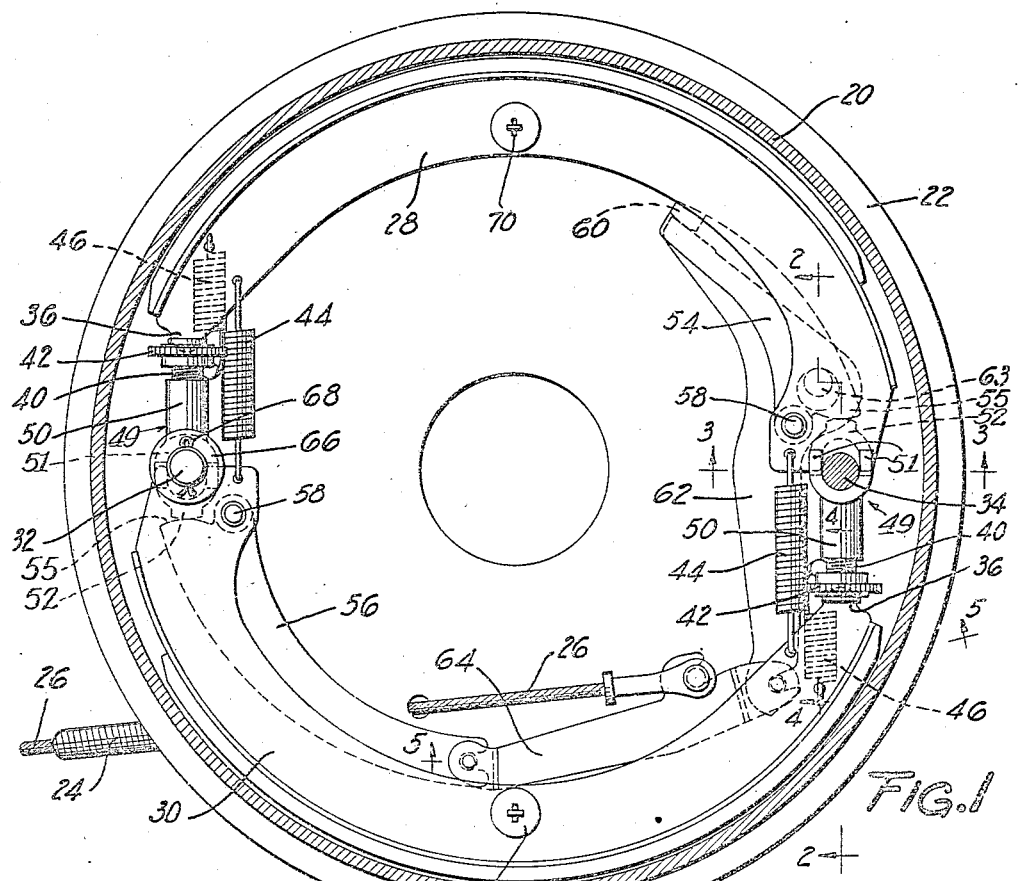
Figure 1 is a vertical section through one illustrative brake, just inside the head of the brake drum, and showing the brake shoes in side elevation.
Figures 2, 3:
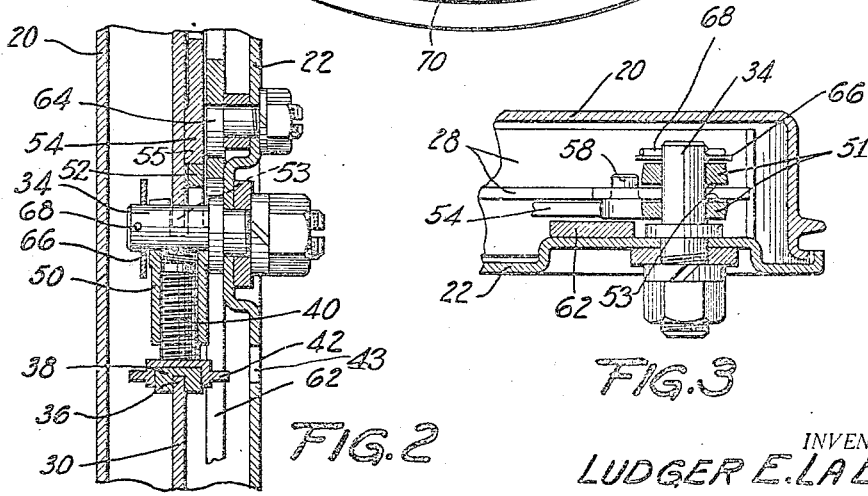
Figure 2 is a partial section on the line 2—2 of Figure 1, showing the novel adjustment.
Figure 3 is a partial section on the line 3—3 of Figure 1, showing one of the brake anchors and the corresponding adjustment.
Figure 4:
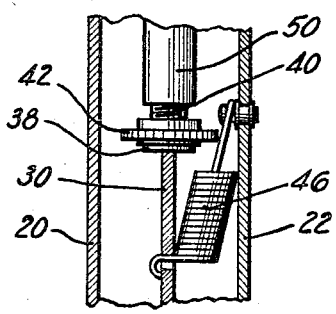
Figure 4 is a partial section on the line 4—4 of Figure 1, showing the arrangement of one of the auxiliary springs.
Figure 5:
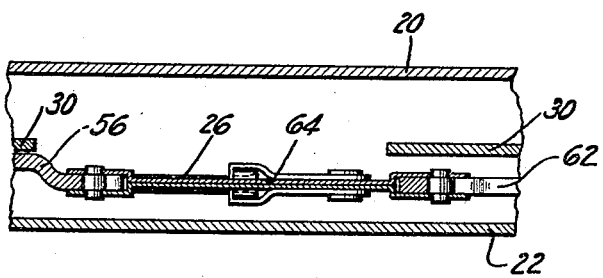
Figure 5 is a partial section on the line 5—5 of Figure 1, showing part of the operating connections.
Figure 6:
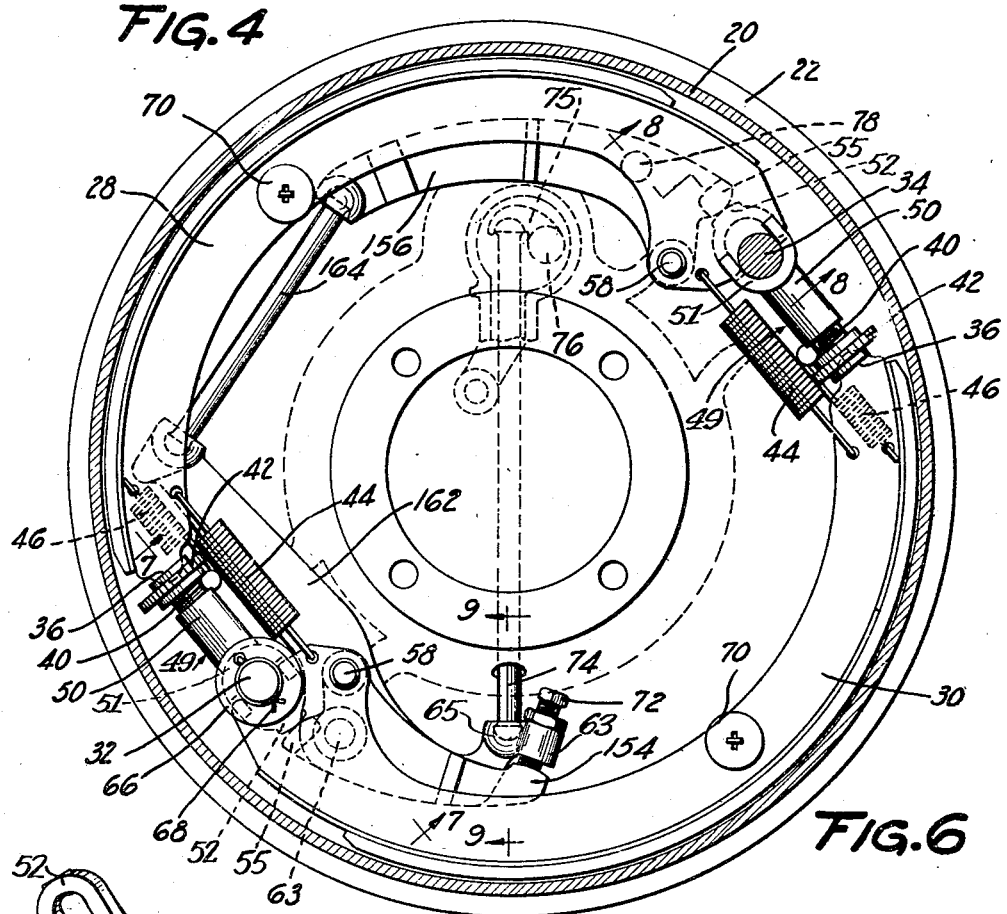
Figure 6 is a section corresponding to Figure 1, but showing the operation of a front brake by a thrust rod extending through a hollow king-pin.
Figure 12:
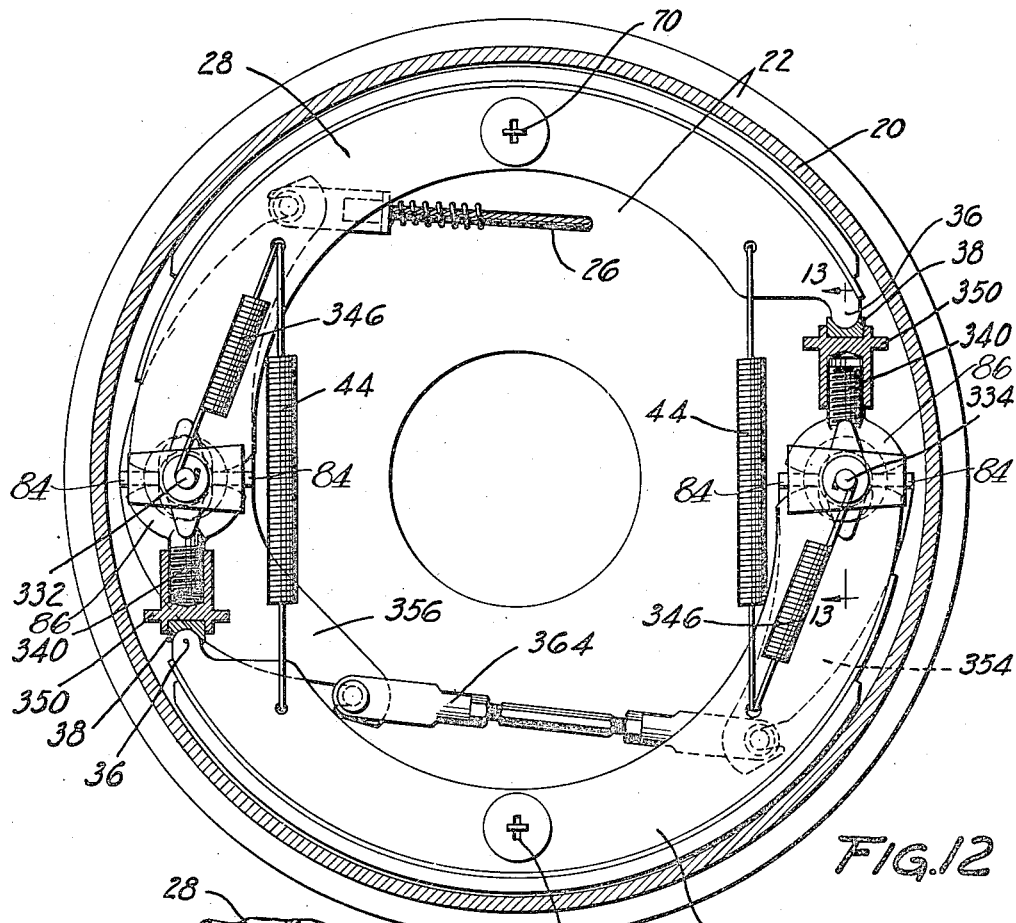
Figure 13:
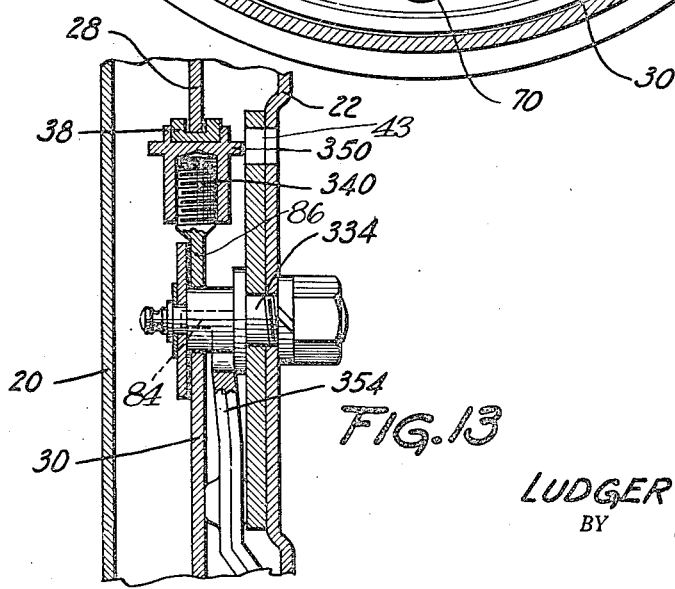

Figures 7 and 8 are partial sections on the lines 7—7 and 8—8 of Figure 6, showing the anchor and adjustment arrangement;

Figure 9 is a partial section on the line 9—9 of Figure 6, showing the arrangement with respect to the brake levers of the thrust rod in the king-pin;

Figure 10 is a partial section corresponding to a portion of Figure 6 but showing one of the rear brakes;

Figure 10A is a section on the line 10A—10A of Figure 10 showing part of the rear brake operating mechanism;

Figure 11 is a partial section on the line 11—11 of Figure 10, showing another part of the rear brake operating mechanism;

Figure 12 is a section corresponding to Figures 1 and 6, but showing another modification;

Figure 13 is a partial section on the line 13—13 of Figure 12, showing one of the anchorages and the corresponding adjustment;

Figure 14 is a section corresponding to Figures 1, 6, and 12, but showing another modification;

Figure 15 is a section corresponding to the left-hand portion of Figure 1, and showing a modified form of applying lever and adjustment yoke; and Figures 16 and 17 are sections respectively on the lines 16—16 and 17—17 of Figure 15.

Each of the illustrated brakes includes a rotatable drum 20, at the open side of which is a support such as a backing plate 22. The drum and the backing plate preferably form a substantially closed chamber housing the brake.

In most of the modifications, a flexible conduit 24 attached at one end to the backing plate forms in effect a flexible extension of the brake chamber. A tension element 26 passes through this conduit and through the backing plate into the brake, where it is attached to the operating linkage as described below. The conduit 24 and cable 26 form a Bowden-type control for operating the brake.

The brake of Figures 1-5 includes a pair of shoes 28 and 30, each having a web the clockwise end of which is formed with a semicircular notch engaging one of two solid rigid anchors or posts 32 and 34 carried by the backing plate and arranged at opposite sides of the brake.

The counter-clockwise end of the web of each of the shoes is formed with a projection 36 seated in and embraced by a slot in one face of a thrust piece 38 of circular outline forming part of a novel adjusting means. In this particular embodiment the thrust piece 36 is rotatably seated in a socket of corresponding outline formed in one end of a part 40, shown with a generally-circular flange 42 formed with teeth or the like for operative engagement with a screwdriver or other tool inserted through a suitable opening 43 in the drum or in the backing plate.

These teeth also interlock with the corresponding one of two return springs 44, thereby yieldingly holding the parts in adjusted position. Each shoe also has at its heel end an auxiliary spring 46 tensioned between the shoe and the backing plate, and inclined at such an angle as to urge the shoe against the backing plate. One function of the springs 46 is to unbalance the brake assembly so that the toes of both shoes engage the drum, thereby determining the ends of the shoes which anchor, before the heels of the shoes leave the anchors.

Figure 1A:
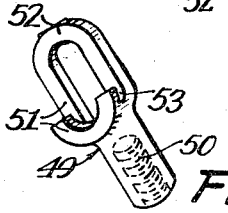
Figure 1A is a perspective view of a novel socket and yoke constituting part of the adjusting and operating means of the brake of Figure 1.

Each of the adjustment parts 40 has its end, opposite the shoe which it engages, threaded adjustably into a part 48 (shown in detail in Figure 1A) having at one end a threaded socket 50, and the other end of which is formed with a yoke 51 encircling and embracing the corresponding anchor. That portion of the yoke on the drum side of the adjacent shoe is left open; the portion between the shoe and the backing plate is integrally formed with a closed end 52 for engagement with the operating lever described below. In the socket part 50, between these two portions, there is a slot 53 embracing the end of the web of the adjacent shoe (see Figure 3).

Adjacent each anchor is an operating lever 54 or 56 arranged between the backing plate and the shoe web, and mounted on the clockwise end of the corresponding shoe by means such as a pivot pin 58 shown as being integral with the lever; these levers have cam or thrust portions 55 operatively engaging the yokes of the socket parts 50 of the adjustments of the opposite shoes.

The lever 54, mounted on the upper shoe 28 at the front of the brake, has a thrust projection 60 engaged by the upper end of a generally-vertical lever 62 adjustably fulcrumed on an eccentric 63 mounted on the backing plate. The lower end of the lever 62 is connected by means such as a link 64 to the lower end of the other operating lever 56. The operating cable 26 may conveniently be connected to the link 64.

The parts assembled relatively to each anchor may be held by means such as a washer 66 held by a cotter-pin or the like 68. Suitable steady rests 70 of any desired type may be provided for the shoes.

The embodiment shown in Figures 6-9 differs from that described above in that the lever 162 (corresponding to the lever 62) operatively engages lever 154 through an adjustable thrust device such as a setscrew 72 threaded into an integral lug 63 extending to one side of the lever 162 at one end, and operates lever 156 through the medium of a thrust link 164 seated in its other end. Lever 162 is formed with a socket 65 in the lug 63 receiving the rounded lower end of a thrust rod 74 passing through a hollow kingpin on which the front wheel is swivelled. Rod 74 may be operated by means such as an eccentric part 75 on a shaft 76 carried on the front axle. A pin 78 may be provided to steady the lever 156 and its shoe, by engaging the side of the lever.

The corresponding rear brake, shown in Figures 10, 10A, and 11 differs only from that just described in that the lever 262 (which actuates the two operating levers and corresponds to 162 in Figure 6) is provided with a flat surface 265 (replacing socket 65 of Figure 6) on the lug 263 which is operatively engaged by the rounded end of an arm 274 on a shaft 276 journaled in a bearing carried by the backing plate and operated by a lever 80 on the outside of the brake.

In the brake of Figures 12 and 13 operating levers 354 and 356 are provided with integral lugs 84 extending on opposite sides of the anchors 332 and 334, radially of the brake, between the ends of the shoes and the ends of a semicircular yoke 351 on the end of each of the adjustment parts 340 threaded into sockets 350 which in this case are formed to receive the slotted shoe-engaging parts 38.

The levers 354 and 356 are connected by an adjustable turnbuckle forming a link 364 extending between their lower ends, and lever 356 extends upwardly and is directly connected to the tension cable 26.

In Figure 14, shoes 428 and 430 embrace anchors 432 and 434 between their ends, and are yieldingly held thereagainst by differential springs 444 and 446. An operating lever 454, pivoted at 458 adjacent the lower end of shoe 430, is engaged opposite the center of the shoe by a thrust pin 460 on a lever 456 connected to the upper end of the shoe. The lower end of the lever 456 is connected to the cable 26. Each of the levers 454 and 456 is connected by means such as an adjustable strut or link 82 to the corresponding end of the shoe 428.

In the modification of Figures 15, 16, and 17, the adjustment part 540, threaded into the socket 550 which in this case is formed to receive the slotted shoe-engaging part 38, has a generally elliptical yoke 551 encircling and engaging the anchor 32, and which is slotted to embrace the web of the shoe 30. This yoke has closed ends 552 for engagement with the operating lever 554 on both sides of the web of the shoe 30, and in this case the lever 554 is also in effect double, being slotted to embrace the shoe web and having thrust parts 555 which engage the yoke on both sides of the web. As shown in Figure 17, this may also be done, if desired, by welding together two stampings 554 to make a slotted lever.

The lever 562 in this case, in the same manner as in Figure 1, engages a thrust part 560 secured to or integral with the lever 554.

While several illustrative embodiments have been described in detail, it is not my intention to limit the scope of my invention to those particular embodiments, or otherwise than by the terms of the appended claims.

I claim:

1. A brake comprising a support provided with rigidly mounted anchors at opposite sides thereof, a pair of shoes having said anchors arranged between their ends and each formed to engage one of the anchors at one end, a device engaging the other end of each shoe and including two relatively adjustable parts one of which engages the corresponding anchor and transmits thereto the torque of its shoe and which is formed with a yoke encircling and projecting beyond the anchor, and applying means including parts adjacent each anchor and engaging the anchor-engaging part of one shoe and the yoke associated with the other shoe.

2. A brake comprising a support provided with rigidly mounted anchors at opposite sides thereof, a pair of shoes having said anchors arranged between their ends and each formed to engage one of the anchors at one end, a device engaging the other end of each shoe and including two thrust parts which are adjustably threaded together and one of which engages the corresponding anchor and transmits thereto the torque of its shoe and which is formed with a yoke encircling and projecting beyond the anchor, and applying means including parts adjacent each anchor and engaging the anchor-engaging part of one shoe and the yoke associated with the other shoe.

3. A brake comprising a support provided with rigidly mounted anchors at opposite sides thereof, a pair of shoes having said anchors arranged between their ends and each formed to engage one of the anchors at one end, a device engaging the other end of each shoe and including two relatively adjustable parts one of which engages the corresponding anchor and transmits thereto the torque of its shoe and which is formed with a yoke encircling and projecting beyond the anchor, applying means including parts adjacent each anchor and engaging the anchor-engaging part of one shoe and the yoke associated with the other shoe, and a pair of return springs for said shoes each engaging a part of the corresponding one of said devices and arranged to hold it yieldingly locked in adjusted position.

4. A brake comprising a support provided with rigidly mounted anchors at opposite sides thereof, a pair of shoes having said anchors arranged between their ends and each formed to engage one of the anchors at one end, a device engaging the other end of each shoe and including two thrust parts which are adjustably threaded together and one of which engages the corresponding anchor and transmits thereto the torque of its shoe and which is formed with a yoke encircling and projecting beyond the anchor, applying means including parts adjacent each anchor and engaging the anchor-engaging part of one shoe and the yoke associated with the other shoe, and a pair of return springs for said shoes each engaging a part of the corresponding one of said devices and arranged to hold it yieldingly locked in adjusted position.

5. A brake comprising a support provided with rigidly mounted anchors at opposite sides thereof, a pair of shoes having said anchors arranged between their ends and each formed to engage one of the anchors at one end, a device engaging the other end of each shoe and including two relatively adjustable parts one of which engages the corresponding anchor and transmits thereto the torque of its shoe and which is formed with a yoke encircling and projecting beyond the anchor, a lever pivoted on the anchor-engaging part of each of said shoes and operatively engaging the yoke associated with the other shoe, and means for operating said levers.

6. A brake comprising a support provided with rigidly mounted anchors at opposite sides thereof, a pair of shoes having said anchors arranged between their ends and each formed to engage one of the anchors at one end, a device engaging the other end of each shoe and including two relatively adjustable parts one of which engages the corresponding anchor and transmits thereto the torque of its shoe and which is formed with a yoke encircling and projecting beyond the anchor, a lever pivoted on the anchor-engaging part of each of said shoes and operatively engaging the yoke associated with the other shoe, a third lever pivoted on said support and in thrust engagement with the lever pivoted on one of the shoes, a link connecting said third lever and the lever pivoted on the other shoe, and means for operating said levers to apply the brake.

7. A brake comprising a support provided with rigidly mounted anchors at opposite sides thereof, a pair of shoes having said anchors arranged between their ends and each formed to engage one of the anchors at one end, a device engaging the other end of each shoe and including two relatively adjustable parts one of which engages the corresponding anchor and transmits thereto the torque of its shoe and which is formed with a yoke encircling and projecting beyond the anchor, a lever pivoted on the anchor-engaging part of each of said shoes and operatively engaging the yoke associated with the other shoe, a third lever pivoted on said support and in thrust engagement with the lever pivoted on one of the shoes, a link connecting said third lever and the lever pivoted on the other shoe, and a tension element connected to said link for operating said levers to apply the brake.

8. A brake comprising a drum, a support at the open side of the drum having anchors projecting into the drum and arranged at opposite sides of the brake, shoes having said anchors arranged between their ends and each arranged to transmit its torque to one anchor when the drum is turning in one direction and to the other anchor when the drum is turning in the other direction, a lever adjacent each anchor pivoted on one end of one of the shoes and arranged to act on the adjacent end of the other shoe, a third lever pivoted on the support and in thrust engagement with the lever pivoted on one of the shoes, a link connecting said third lever and the lever pivoted on the other of the shoes, and applying means acting on said link.

9. A brake comprising a drum, a support at the open side of the drum having anchors projecting into the drum and arranged at opposite sides of the brake, shoes having said anchors arranged between their ends and each arranged to transmit its torque to one anchor when the drum is turning in one direction and to the other anchor when the drum is turning in the other direction, a lever adjacent each anchor pivoted on one end of one of the shoes and arranged to act on the adjacent end of the other shoe, a third lever pivoted on the support and in thrust engagement with the lever pivoted on one of the shoes, a link connecting said third lever and the lever pivoted on the other of the shoes, and a force-transmitting tension element connected to said link.

10. A brake comprising a drum, a support at the open side of the drum having anchors projecting into the drum and arranged at opposite sides of the brake, shoes having said anchors arranged between their ends and each arranged to transmit its torque to one anchor when the drum is turning in one direction and to the other anchor when the drum is turning in the other direction, a lever adjacent each anchor pivoted on one end of one of the shoes and arranged to act on the adjacent end of the other shoe, a third lever pivoted on the support and in thrust engagement with the lever pivoted on one of the shoes, a link connecting said third lever and the lever pivoted on the other of the shoes, and a force-transmitting tension element connected to said link, said element extending through the support and through a flexible conduit outside the brake and operatively engaging the support at one end, said element and the conduit forming a Bowden-type control for the brake.

11. A brake comprising a drum, a support at the open side of the drum having anchors projecting into the drum and arranged at opposite sides of the brake, shoes having said anchors arranged between their ends and each arranged to transmit its torque to one anchor when the drum is turning in one direction and to the other anchor when the drum is turning in the other direction, a lever adjacent each anchor pivoted on one end of one of the shoes and arranged to act on the adjacent end of the other shoe, a third lever pivoted on the support and in thrust engagement with the lever pivoted on one of the shoes, a link connecting said third lever and the lever pivoted on the other of the shoes, and a force-transmitting tension element connected to said link, said element extending through the support and through a flexible conduit outside the brake and operatively engaging the support at one end, said element and the conduit forming a Bowden-type control for the brake, the drum and support forming a substantially closed chamber inclosing the brake and said conduit forming in effect a flexible extension of said brake chamber.

12. An adjusting device for a brake comprising two parts which are adjustably threaded together and one of which is adjustably rotatable and has in its end a socket of circular outline, in combination with a thrust part of circular outline seated in said socket and formed with a slot to receive the end of a shoe web and the other of which is formed at its free end with an anchor-engaging yoke.

13. An adjusting device for a brake comprising two adjustably connected parts one of which is adjustably rotatable and has in its end a socket of circular outline, in combination with a thrust part of circular outline seated in said socket and formed with a slot to receive the end of a shoe web, and the other of which is formed at its free end with an anchor-engaging yoke.

14. A brake comprising a backing plate having an anchor thereon, a pair of shoes having said anchor between their ends and one of which engages said anchor directly, an adjustment at the end of the other shoe comprising two parts which are threaded together and one of which is arranged to take thrust from said other shoe and the other of which has a notch engaging and encircling said anchor and the part of which between the backing plate and said one shoe is integrally extended over the end of the notch to form a yoke on the backing plate side of said one shoe only, and an applying device arranged between said one shoe and the backing plate and which operatively engages said one shoe and said yoke.

15. A brake comprising a backing plate having an anchor thereon, a pair of shoes having said anchor between their ends and one of which engages said anchor directly, an adjustment at the end of the other shoe comprising two parts which are threaded together and one of which is arranged to take thrust from said other shoe and the other of which has a yoke encircling said anchor and extending between the backing plate and said one shoe, and an applying device arranged between said one shoe and the backing plate and which operatively engages said one shoe and said yoke.

16. A brake for a front wheel having a hollow king-pin and a support swivelled thereon, and comprising friction means associated with said support and provided with interconnected operating levers arranged at opposite sides of the brake, a third lever pivoted on the support and in thrust engagement with one of the operating levers and which has a part in line with the king-pin axis, and a thrust rod extending through the king-pin and arranged with its end engaging said aligned part.

17. A brake for a front wheel having a hollow king-pin and a support swivelled thereon, and comprising friction means associated with said support and provided with interconnected operating levers arranged at opposite sides of the brake, a third lever pivoted on the support and having at its end an adjustable device in thrust engagement with one of the operating levers and which has a part in line with the king-pin axis, and a thrust rod extending through the king-pin and arranged with its end engaging said aligned part.

18. A brake comprising an anchor, a pair of shoes having webs one of which directly engages said anchor at its end, an adjusting device for the end of the other shoe having a yoke encircling said anchor and which yoke is slotted to embrace the end of the web of said one shoe, and a lever having parts on opposite sides of said one shoe and which acts on said one shoe and on said yoke.

19. A brake comprising an anchor, a pair of shoes having webs one of which directly engages said anchor at its end, and an adjusting device for the end of the other shoe having a yoke encircling said anchor and which yoke is slotted to embrace the end of the web of said one shoe.

20. A brake comprising an anchor, a pair of shoes having webs one of which directly engages said anchor at its end, and an adjusting device for the end of the other shoe having a yoke encircling said anchor and which yoke is slotted to embrace the end of the web of said one shoe, together with a lever slotted to embrace the web of said one shoe and which is pivoted thereon and which has parts on opposite sides thereof in thrust engagement with said yoke.

21. A brake lever which is formed with a slot to embrace the web of a shoe and which has a pivot for connecting it to said web and which has thrust parts on opposite sides of said slot.

LUDGER E. LA BRIE.